No. 739,390. PATENTED SEPT. 22, 1903.
H. COAD & W. G. MILLER.
CORN HUSKER.
APPLICATION FILED DEC. 17, 1902.
NO MODEL.
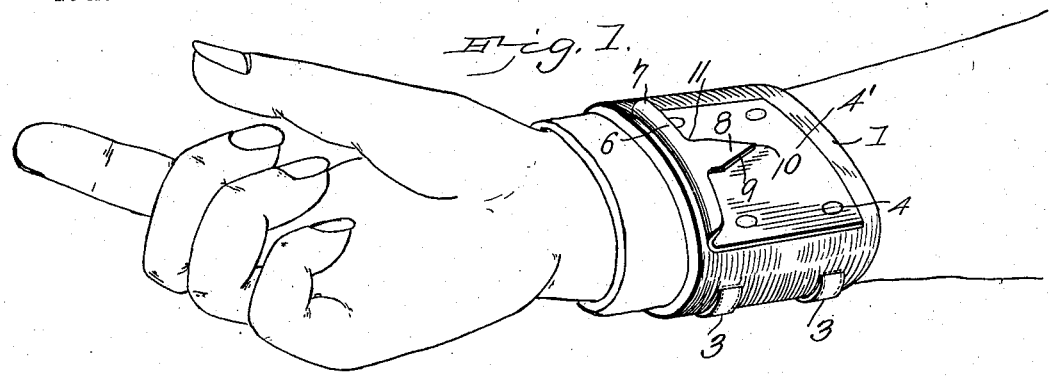
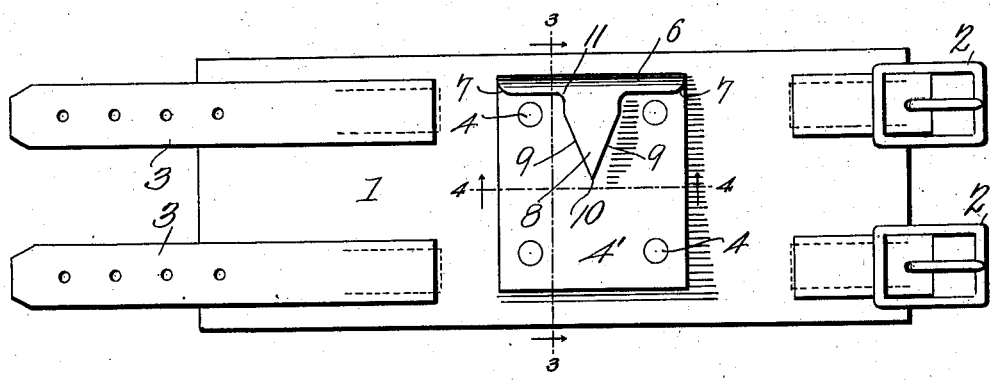
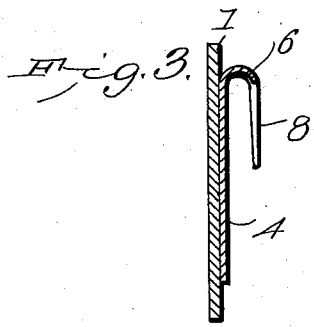
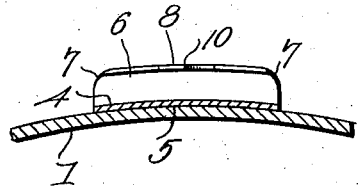
Witnesses
H. Coad and
W. G. Miller, Inventors
by C. A. Snow & Co.
Attorneys No. 739,390. Patented September 22, 1903.

UNITED STATES PATENT OFFICE.

HENRY COAD AND WILLIAM G. MILLER, OF AINSWORTH, NEBRASKA.

CORN-HUSKER.

SPECIFICATION forming part of Letters Patent No. 739,390, dated September 22, 1903.

Application filed December 17, 1902. Serial No. 135,629. (No model.)

*To all whom it may concern:*

Be it known that we, HENRY COAD and WILLIAM G. MILLER, citizens of the United States, residing at Ainsworth, in the county of Brown and State of Nebraska, have invented a new and useful Corn-Husker, of which the following is a specification.

This invention relates to a corn-husker, and has for its object to provide a simple inexpensive device of this character adapted for application to the wrist or forearm of a person, so as to leave the hand entirely free, and which may be used with equal facility on either arm.

A further object of the invention is to provide a husker with an upwardly-extending curved flange arranged on each side of a longitudinally-disposed overhanging hook which allows perfect freedom of the hand without the liability of coming in contact with the hook and also forms a means for spreading the husks as they are cut or torn by the hook.

With these and other objects in view the invention consists in the construction and novel combination and arrangement of parts hereinafter fully described, illustrated in the accompanying drawings, and pointed out in claims hereto appended.

In the drawings, Figure 1 is a perspective view of the present device applied to the forearm of an operator. Fig. 2 is a plan view of the device. Fig. 3 is a transverse section taken on the line 3 3 of Fig. 2. Fig. 4 is a longitudinal section taken on the line 4 4 of Fig. 2.

Similar numerals of reference indicate corresponding parts in all the figures of the drawings.

1 indicates a wristband, made of any suitable material, preferably leather, having buckles 2 and straps 3, attached, respectively, to the opposite ends thereof and by means of which the husker is attached to the arm of the operator. Secured to the wristband 1 by means of rivets 4 or other suitable fastening devices is a metal plate 4', preferably rectangular in shape and slightly bowed, as shown at 5, so as to conform to the shape of the arm. One end of the plate 4 is bent to form an upwardly-extending curved flange 6, having rounded end portions 7. Projecting from the flange 6 at a point intermediate of its ends and formed integral therewith is an overhanging longitudinally-disposed hook or opener 8, having inclined side edges 9, terminating in a point 10. The base of the hook is preferably rounded at its juncture with the flange 6, as shown at 11, which assists in spreading the husks, as will be more fully explained hereinafter.

The operation of the device is as follows: The husker is attached by means of the band to the wrist or forearm. The operator grasps the ear at the top by the stem and then reaches out with the right hand and draws the same back, so that the hook pierces the husks, and the husks coming in contact with the front edge of the flange 6 spreads them, thus exposing the ear. When this is done, the fingers are in a position to grasp the exposed ear, and it can then be easily detached from the husks.

Various changes in form, proportions, and minor details of construction may be resorted to without departing from the principle or sacrificing any of the advantages of the invention.

Having thus described the invention, what is claimed is—

1. A corn-husker comprising a wristband, a plate secured thereto, one end of said plate being curved upwardly and inwardly to form a spreading-flange and provided with a longitudinally-disposed overhanging hook.

2. A corn-husker comprising a wristband, a plate secured thereto, one end of said plate being curved upwardly and inwardly to form a spreading-flange extending the entire width of the plate and provided with a centrally-disposed overhanging longitudinal hook.

3. A corn-husker comprising a wristband, a curved plate secured thereto, one end of said plate being curved upwardly and inwardly to form a spreading-flange and a longitudinally-disposed overhanging integral hook projecting from the flange, said hook being rounded at its junction with the flange.

In testimony that we claim the foregoing as our own we have hereto affixed our signatures in the presence of two witnesses.

HENRY COAD.
WM. G. MILLER.

Witnesses:
C. W. POTTER,
C. O. MURPHY.